(12) United States Patent
Nishizono et al.

(10) Patent No.: US 10,044,378 B2
(45) Date of Patent: Aug. 7, 2018

(54) ELECTRONIC DEVICE

(71) Applicant: KYOCERA Corporation, Kyoto (JP)

(72) Inventors: Mitsuhiro Nishizono, Hachioji (JP);
Yasuhiro Fukushima, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/480,114

(22) Filed: Apr. 5, 2017

(65) Prior Publication Data
US 2017/0302305 A1 Oct. 19, 2017

(30) Foreign Application Priority Data

Apr. 13, 2016 (JP) ................. 2016-080176

(51) Int. Cl.
| | | |
|---|---|---|
| *H04B 7/00* | (2006.01) | |
| *H04B 1/04* | (2006.01) | |
| *H04B 1/034* | (2006.01) | |
| *H04B 1/3827* | (2015.01) | |

(52) U.S. Cl.
CPC ............ *H04B 1/04* (2013.01); *H04B 1/0343* (2013.01); *H04B 1/385* (2013.01); *H04B 1/3838* (2013.01); *H04B 2001/3866* (2013.01)

(58) Field of Classification Search
CPC ...... H04B 1/04; H04B 1/0343; H04B 13/005; H04B 1/385; H04B 2001/3866; H04W 4/008

See application file for complete search history.

(56) References Cited

U.S. PATENT DOCUMENTS

| | | | |
|---|---|---|---|
| 2004/0104864 A1* | 6/2004 | Nakada | G02B 27/017 345/8 |
| 2008/0220831 A1 | 9/2008 | Alameh et al. | |
| 2012/0328134 A1 | 12/2012 | Lewis | |
| 2013/0178174 A1 | 7/2013 | Geris et al. | |
| 2014/0240474 A1* | 8/2014 | Kondo | H01Q 9/16 348/56 |
| 2015/0341869 A1* | 11/2015 | Sen | H04W 52/34 455/522 |
| 2015/0372656 A1 | 12/2015 | Mow et al. | |
| 2016/0165179 A1* | 6/2016 | Karimi-Cherkandi | H04L 65/80 348/14.07 |

FOREIGN PATENT DOCUMENTS

| | | |
|---|---|---|
| JP | H11-353444 A | 12/1999 |
| JP | 2013-513275 A | 4/2013 |
| JP | 2013-090061 A | 5/2013 |

OTHER PUBLICATIONS

The extended European search report issued by the European Patent Office dated Sep. 19, 2017, which corresponds to EP17165395.9-1874 and is related to U.S. Appl. No. 15/480,114.

\* cited by examiner

*Primary Examiner* — Tuan Pham
(74) *Attorney, Agent, or Firm* — Studebaker & Brackett PC (57) ABSTRACT

This electronic device includes a wearing detector, provided at a position that comes close to or in contact with a human body when the electronic device is worn by a user, that detects wearing of the electronic device by the user, an antenna that transmits radio waves, and a controller that restricts transmission of radio waves from the antenna when wearing is detected by the wearing detector.

14 Claims, 12 Drawing Sheets

| | Transmission mode | Transmission speed (Mbps) | Transmission time (s/Mb) | Desired C/N (dB) | Desired C/N (True value) | SAR coefficient |
|---|---|---|---|---|---|---|
| 201 | BPSK1/2 | 7 | 1/7 | -10 | 0.1 | 0.014 |
| 202 | QPSK1/2 | 14 | 1/14 | 0 | 1 | 0.071 |
| 203 | QPSK3/4 | 21 | 1/21 | 2.5 | 1.8 | 0.086 |
| 204 | 16QAM1/2 | 28 | 1/28 | 6.5 | 4.5 | 0.161 |
| 205 | 16QAM3/4 | 42 | 1/42 | 9 | 7.9 | 0.188 |
| 206 | 16QAM1 | 56 | 1/56 | 13.3 | 21.4 | 0.382 |
| 207 | 64QAM2/3 | 56 | 1/56 | 17.4 | 55 | 0.982 |
| 208 | 64QAM3/4 | 63 | 1/63 | 17.8 | 60.3 | 0.957 |
| 209 | 64QAM1 | 84 | 1/84 | 19.8 | 95.5 | 1.137 |

| Temperature (°C) | Transmission mode |
|---|---|
| 50~60 | BPSK1/2 |
| 40~ | QPSK1/2 |
| 30~ | QPSK3/4 |
| 20~ | 16QAM1/2 |
| 10~ | 16QAM3/4 |
| 0~ | 16QAM1 |
| −10~ | 64QAM3/4 |
| −20~ | 64QAM2/3 |

ELECTRONIC DEVICE

CROSS REFERENCE TO RELATED APPLICATIONS

This application claims priority to and the benefit of Japanese Patent Application No. 2016-080176 filed Apr. 13, 2016, the entire contents of which are incorporated herein by reference.

TECHNICAL FIELD

The present disclosure relates to an electronic device.

BACKGROUND

In recent years, the use of electronic devices such as wearable terminals that can be used by being worn on the user's body has become more widespread. As examples of electronic devices worn on the user's body, JP 2013-90061 A (PTL 1), JP H11-353444 A (PTL 2), and JP 2013-513275 A (PTL 3) disclose eyeglasses-type electronic devices.

CITATION LIST

Patent Literature

PTL 1: JP 2013-90061 A
PTL 2: JP H11-353444 A
PTL 3: JP 2013-513275 A

SUMMARY

Electronic devices that are used while worn on the user's body need to have a Specific Absorption Rate (SAR) equal to or less than a certain threshold. In the eyeglasses-type electronic devices in PTL 1 to 3, however, the antenna of the wireless communication device that transmits and receives radio waves is in close contact with the user's head. Therefore, the SAR might increase above the threshold.

Therefore, it would be helpful to provide an electronic device that can reduce the SAR.

An electronic device according to an embodiment of this disclosure includes a wearing detector provided at a position that comes close to or in contact with a human body when the electronic device is worn by a user, the wearing detector being configured to detect wearing of the electronic device by the user; an antenna configured to transmit radio waves; and a controller configured to restrict transmission of radio waves from the antenna when wearing is detected by the wearing detector.

The electronic device according to one of the embodiments of this disclosure can reduce the SAR.

BRIEF DESCRIPTION OF THE DRAWINGS

In the accompanying drawings.

DETAILED DESCRIPTION

Embodiments of the present disclosure are described in detail with reference to the accompanying drawings. Note that in the present disclosure, suspending transmission of radio waves and restricting the transmission mode used in transmission of radio waves are both forms of restricting transmission of radio waves.

Embodiment 1

Figure 1:
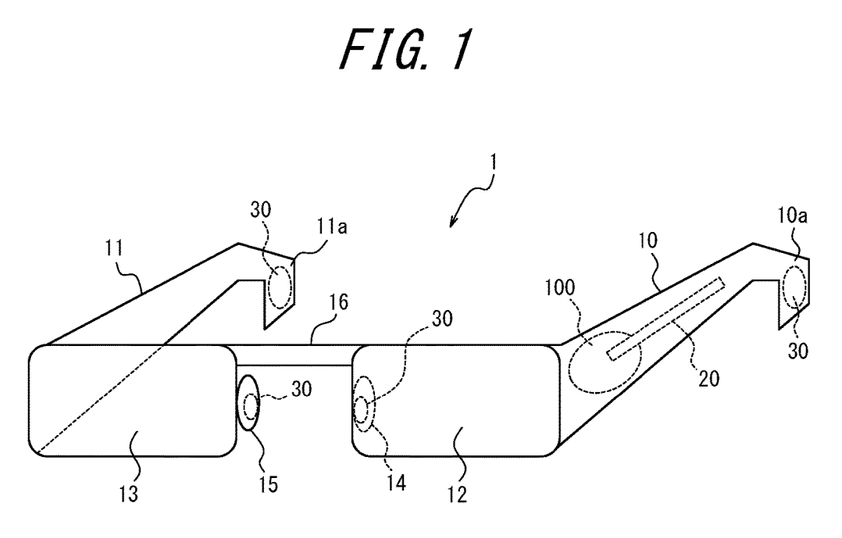
FIG. 1 is a perspective view schematically illustrating the configuration of an electronic device according to Embodiment 1 of the present disclosure.

FIG. 1 is a perspective view schematically illustrating the configuration of an electronic device 1 according to Embodiment 1 of the present disclosure. The electronic device 1 is an eyeglasses-type electronic device that includes temples 10 and 11, lenses 12 and 13, nose pads 14 and 15, a bridge 16, an antenna 20, a wearing detector 30, and circuitry 100.

The temple 10 is positioned on the left side of the user's head when the user is wearing the electronic device 1 (state of wearing by the user). The temple 11 is positioned on the right side of the user's head when the user is wearing the electronic device 1.

The temple 10 also has an earpiece 10a at one end thereof. The temple 11 also has an earpiece 11a at one end thereof. The earpiece 10a rests on the user's left ear in the state of wearing by the user. The earpiece 11a rests on the user's right ear in the state of wearing by the user. The temple 10 is connected at the other end to the lens 12. Also, the temple 11 is connected at the other end to the lens 13.

The lens 12 is connected to the temple 10 at one end and to the bridge 16 at the other end. The lens 13 is connected to the temple 11 at one end and to the bridge 16 at the other end. The lens 12 is positioned in front of the user's left eye in the state of wearing by the user. The lens 13 is positioned in front of the user's right eye in the state of wearing by the user.

The nose pad 14 is provided on the bridge 16 side of the lens 12. The nose pad 15 is provided on the bridge 16 side of the lens 13. The nose pad 14 is disposed so as to abut the left side of the user's nose in the state of wearing by the user. The nose pad 15 is disposed so as to abut the right side of the user's nose in the state of wearing by the user.

The bridge 16 maintains the left and right lenses 12 and 13 in a predetermined positional relationship by connecting the lenses 12 and 13.

The antenna 20 is a monopole antenna provided integrally with the electronic device 1. Another type of antenna, such as a dipole antenna, an inverted-F antenna, or the like may be used as the antenna 20. FIG. 1 illustrates an example of providing the antenna 20 inside the temple 10, but the antenna 20 may be provided at any position in the electronic device 1. The antenna 20 is not limited to being one antenna, and a plurality of antennas may be provided.

The wearing detector 30 is a device for detecting wearing of the electronic device 1 by the user. The wearing detector 30 may, for example, be configured by an electrode of a proximity sensor or a touch sensor provided in the nose pad 14 or 15, the earpiece 10a or 11a, or the like at a position near to or in contact with a human body when the electronic device 1 is worn by the user. By detecting a change in capacitance of the electrode, the wearing detector 30 detects proximity of or contact with a human body as the state of wearing by the user.

The circuitry 100 feeds power to the antenna 20 via a feeder that extends from the circuitry 100. FIG. 1 illustrates an example of providing the circuitry 100 inside the temple 10, but the circuitry 100 may be provided at any position in the electronic device 1.

Figure 2:
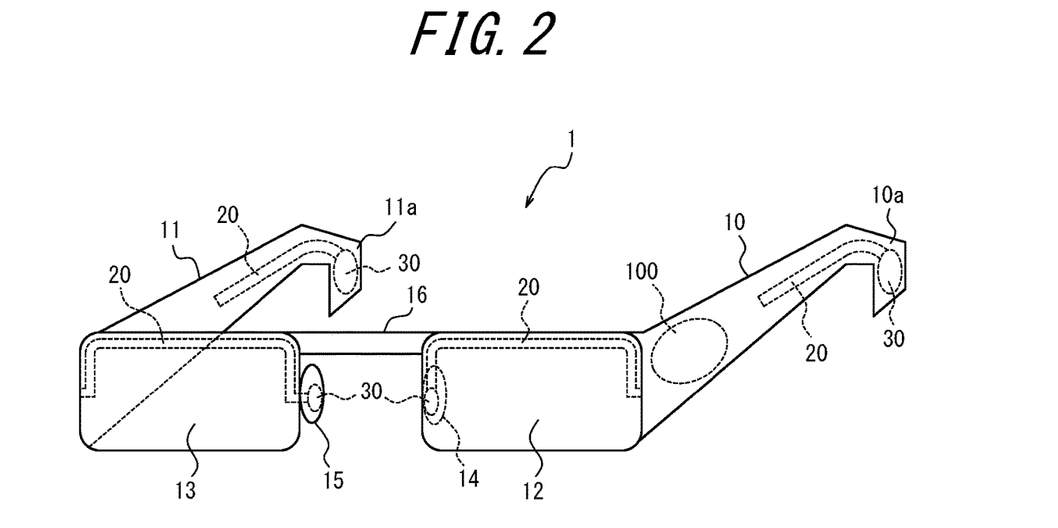
FIG. 2 is a perspective view schematically illustrating the configuration of a modification to the electronic device in FIG. 1.

As illustrated in FIG. 2, the wearing detector 30 may be configured integrally with the antenna 20. With this configuration, the occurrence of interference between the antenna 20 and the wearing detector 30 can be reduced. By detecting a change in the capacitance of the antenna 20, a change in the capacitance of the wearing detector 30 can be detected. Therefore, the wiring up to the wearing detector 30 becomes unnecessary, and space can be minimized.

Figure 3:
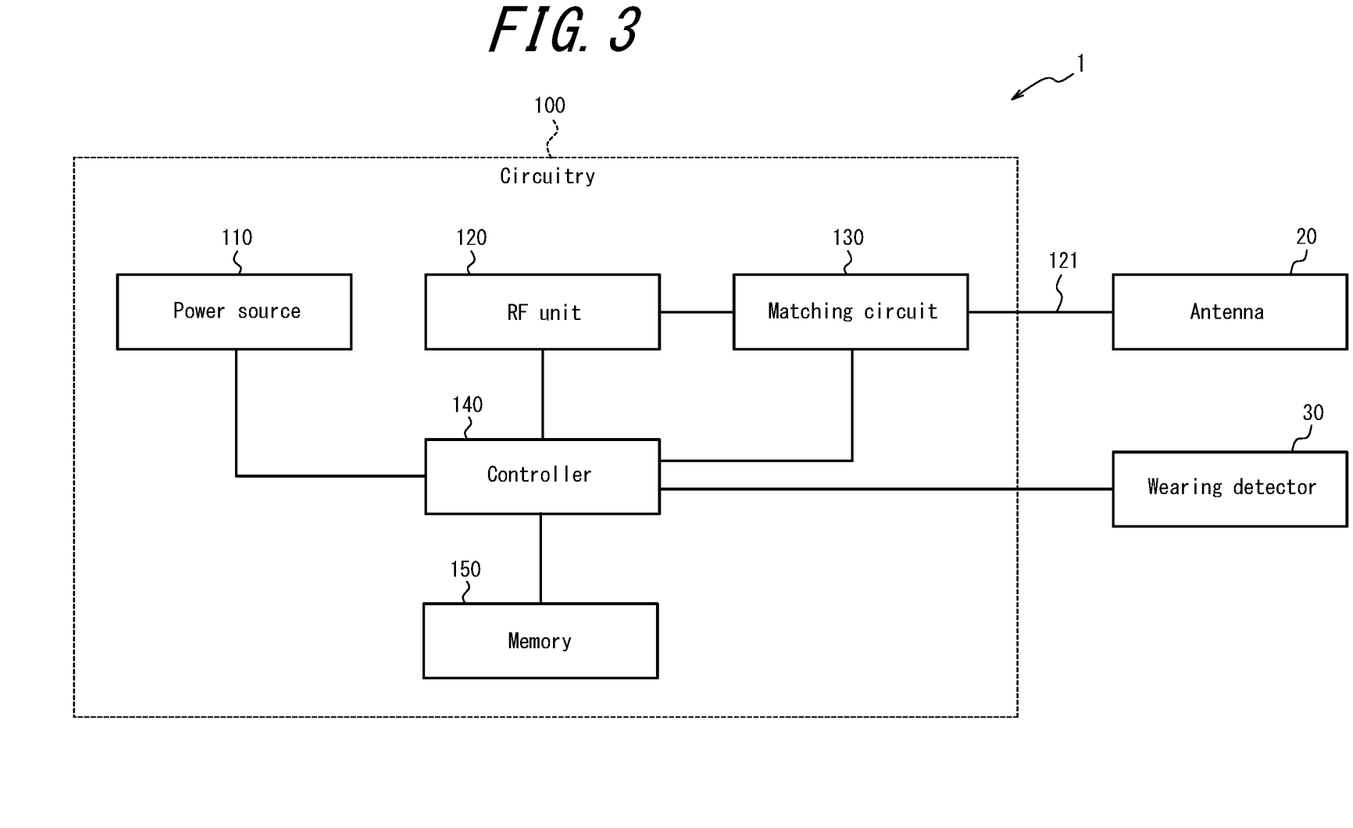
FIG. 3 is a block diagram schematically illustrating the configuration of the electronic device in FIG. 1.

FIG. 3 is a block diagram schematically illustrating the configuration of the electronic device 1. As illustrated in FIG. 3, the circuitry 100 provided in the electronic device 1 includes a power source 110, an RF unit 120, a matching circuit 130, a controller 140, and a memory 150.

The power source 110 for example has a battery and supplies power to the RF unit 120, the controller 140, the memory 150, and the like. In the example illustrated in FIG. 3, to simplify the drawing, the power source 110 is only connected to the controller 140, but the power source 110 actually provides power to each member in FIG. 3 and to each of the other members of the electronic device 1.

The RF unit 120 feeds power to the antenna 20 via the matching circuit 130 and the feeder 121 and transmits and receives radio waves to and from the antenna 20. The RF unit 120 provides a signal of a predetermined frequency to the matching circuit 130. The RF unit 120 also modulates the signal received from the controller 140 to a signal of a higher frequency and demodulates the signal received from the matching circuit 130 to a signal of a lower frequency.

The matching circuit 130 adjusts the impedance so as to lower the energy loss between the RF unit 120 and the antenna 20. Under control by the controller 140, the matching circuit 130 can match the antenna 20 more suitably by adjusting the impedance in accordance with whether wearing is detected by the wearing detector 30. As a result, in accordance with the change in capacitance of the antenna 20 produced depending on whether the electronic device 1 is being worn, appropriate antenna characteristics can be selected. Therefore, the transmission power can be reduced, and heat generation can be suppressed. These effects obtained by switching the matching of the antenna 20 in accordance with whether the electronic device 1 is being worn are more prominent when the antenna 20 and the wearing detector 30 are configured integrally. Switching of matching in the matching circuit 130 is accomplished by an appropriate combination of switching SWs that switch the connection of one or more inductors and capacitors, changing the impedance of the inductors and capacitors, and the like.

The controller 140 acquires results of detection by the wearing detector 30 and the like and controls operation of the RF unit 120, the matching circuit 130, and the like based on results of detection. The controller 140 may, for example, be configured by a microcomputer having a non-volatile memory area, a processor that executes a control program stored in the memory area, and a volatile, temporary memory area.

The memory 150 can be configured by a semiconductor memory, a magnetic memory, or the like. The memory 150 stores programs and the like used in processing executed by the controller 140.

Figure 4:
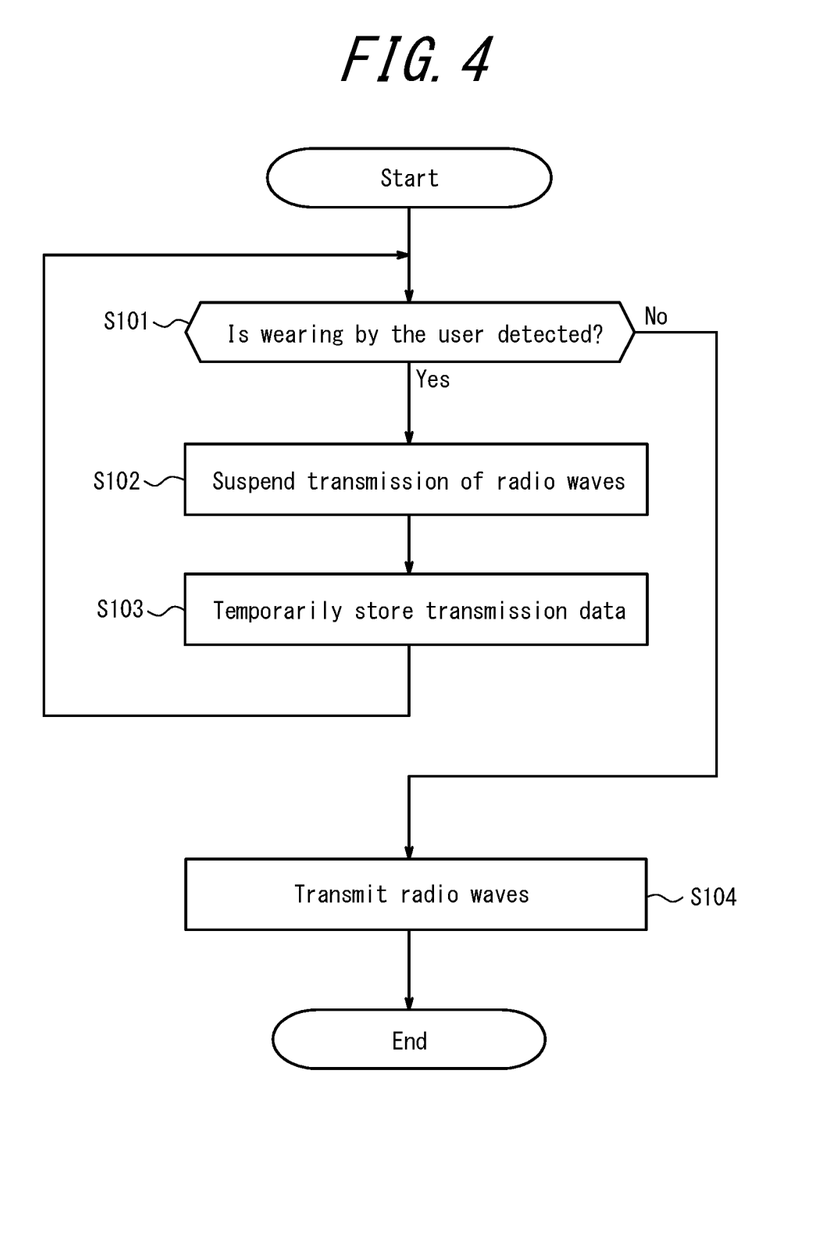
FIG. 4 is a flowchart illustrating first suspension processing by the electronic device in FIG. 1.

With reference to the flowchart in FIG. 4, the processing to suspend radio wave transmission executed by the controller 140 of the electronic device 1 ("first suspension processing") is described.

The controller 140 determines whether wearing of the electronic device 1 by the user is detected by the wearing detector 30 (step S101). When wearing by the user is detected (step S101: Yes), the controller 140 proceeds to the processing in step S102. On the other hand, when wearing by the user is not detected (step S101: No), the controller 140 transmits radio waves via the RF unit 120 in accordance with regular processing (step S104) and terminates this processing.

In the processing in step S102, the controller 140 suspends transmission of radio waves via the RF unit 120. Also, the controller 140 stores transmission data to be transmitted in the memory 150 (step S103).

After the end of processing in step S102 and step S103, the controller 140 returns to the determination processing in step S101. When wearing by the user is not detected by the wearing detector 30 (step S101: No), the controller 140 transmits the transmission data stored in the memory 150 via the RF unit 120 and then transmits radio waves in accordance with regular processing (step S104). The controller 140 then terminates this processing. In other words, when restarting transmission of radio waves, the controller 140 controls transmission of the transmission data stored in the memory 150.

In this way, the electronic device 1 suspends transmission of radio waves in the state of wearing by the user, during which the SAR increases easily, and restarts transmission of radio waves upon release from the state of wearing by the user. The electronic device 1 can thus reduce the SAR. Accordingly, the electronic device 1 can reduce the effect on the body.

Also, the electronic device 1 prevents loss of transmission data by temporarily storing transmission data while transmission of radio waves is suspended and transmitting stored transmission data when restarting transmission of radio waves.

Figure 5:
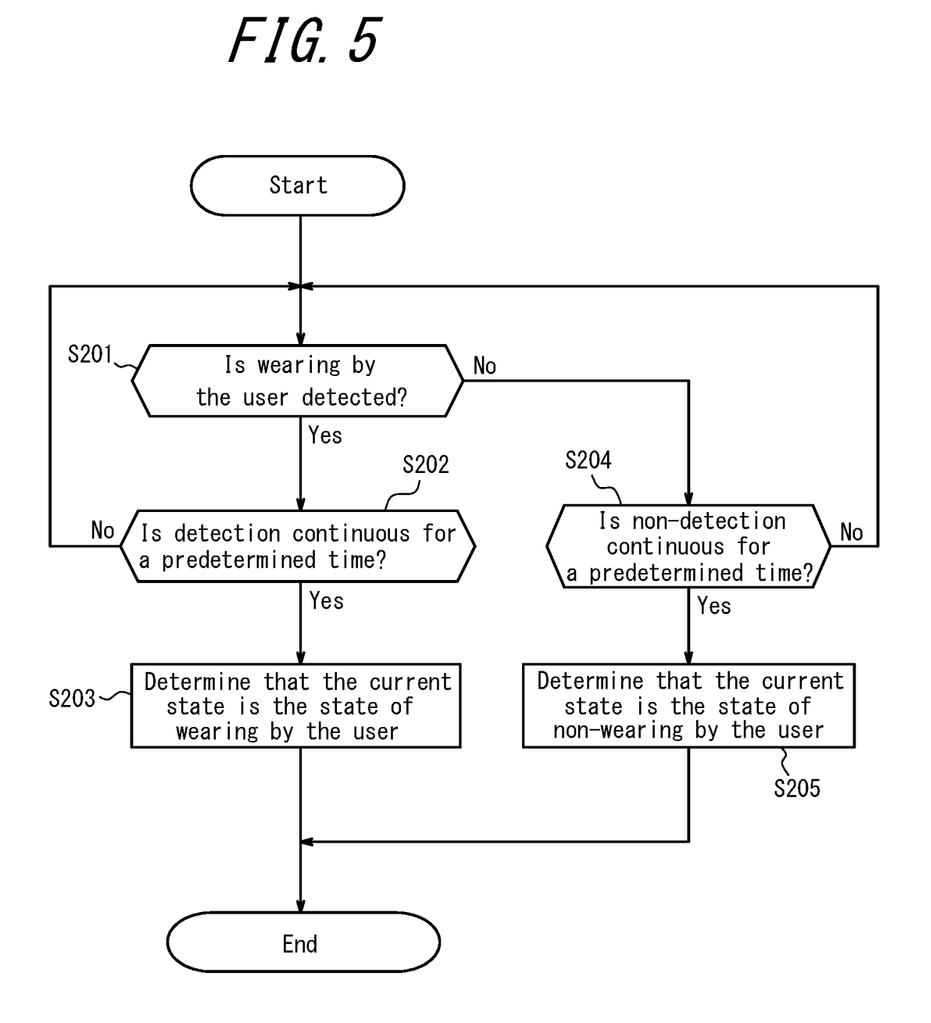
FIG. 5 is a flowchart illustrating chattering prevention processing by the electronic device in FIG. 1.

Next, with reference to the flowchart in FIG. 5, the chattering prevention processing executed by the controller 140 of the electronic device 1 is described.

The controller 140 determines whether wearing of the electronic device 1 by the user is detected by the wearing detector 30 (step S201). When wearing by the user is detected (step S201: Yes), the controller 140 determines whether the state of detection is continuous for a predetermined time or longer (step S202).

When the state of detection is continuous for a predetermined time or longer (step S202: Yes), the controller 140 determines that the current state is the state of wearing by the user (step S203) and terminates processing. On the other hand, when determining that the state of detection has not continued for a predetermined time or longer, i.e. that wearing by the user has stopped being detected before a predetermined time elapses (step S202: No), the controller 140 returns to the determination processing in step S201.

When wearing by the user is not detected (step S201: No), the controller 140 determines whether the state of non-detection is continuous for a predetermined time or longer (step S204).

On the other hand, when determining that the state of non-detection has not continued for a predetermined time or longer, i.e. that wearing by the user has been detected before a predetermined time elapses (step S204: No), the controller 140 returns to the determination processing in step S201.

When the state of non-detection is continuous for a predetermined time or longer (step S204: Yes), the controller 140 determines that the current state is the state of non-wearing by the user (step S205) and terminates processing.

In this way, the electronic device 1 determines that the current state is the state of wearing by the user when the detection state of wearing by the user is continuous for a predetermined time or longer and is the state of non-wearing by the user when the non-detection state of wearing by the user is continuous for a predetermined time or longer. Accordingly, entrance into the state of non-wearing by the user can be prevented when, for example, the user wearing the electronic device 1 exercises, and wearing by the user is temporarily not detected because of vibration caused by the exercise. Similarly, entrance into the state of wearing by the user can be prevented when, for example, the user is not wearing the electronic device 1, but wearing by the user is detected temporarily due to vibration or the like. In other words, with the electronic device 1, so-called chattering produced by the wearing and non-wearing states by the user can be prevented, thereby increasing the user-friendliness.

The above-described chattering prevention processing may be applied to the processing in step S101 of the first suspension processing. In other words, in the determination processing of step S101, the controller 140 may proceed to the processing of step S102 when determining that the current state is the state of wearing by the user and proceed to the processing of step S104 when determining that the current state is the state of non-wearing by the user. Similarly, the determination processing of whether or not wearing by the user is detected in each of the below-described instances of processing may be processing to determine whether the current state is the state of wearing by the user.

Embodiment 2

Figure 6:
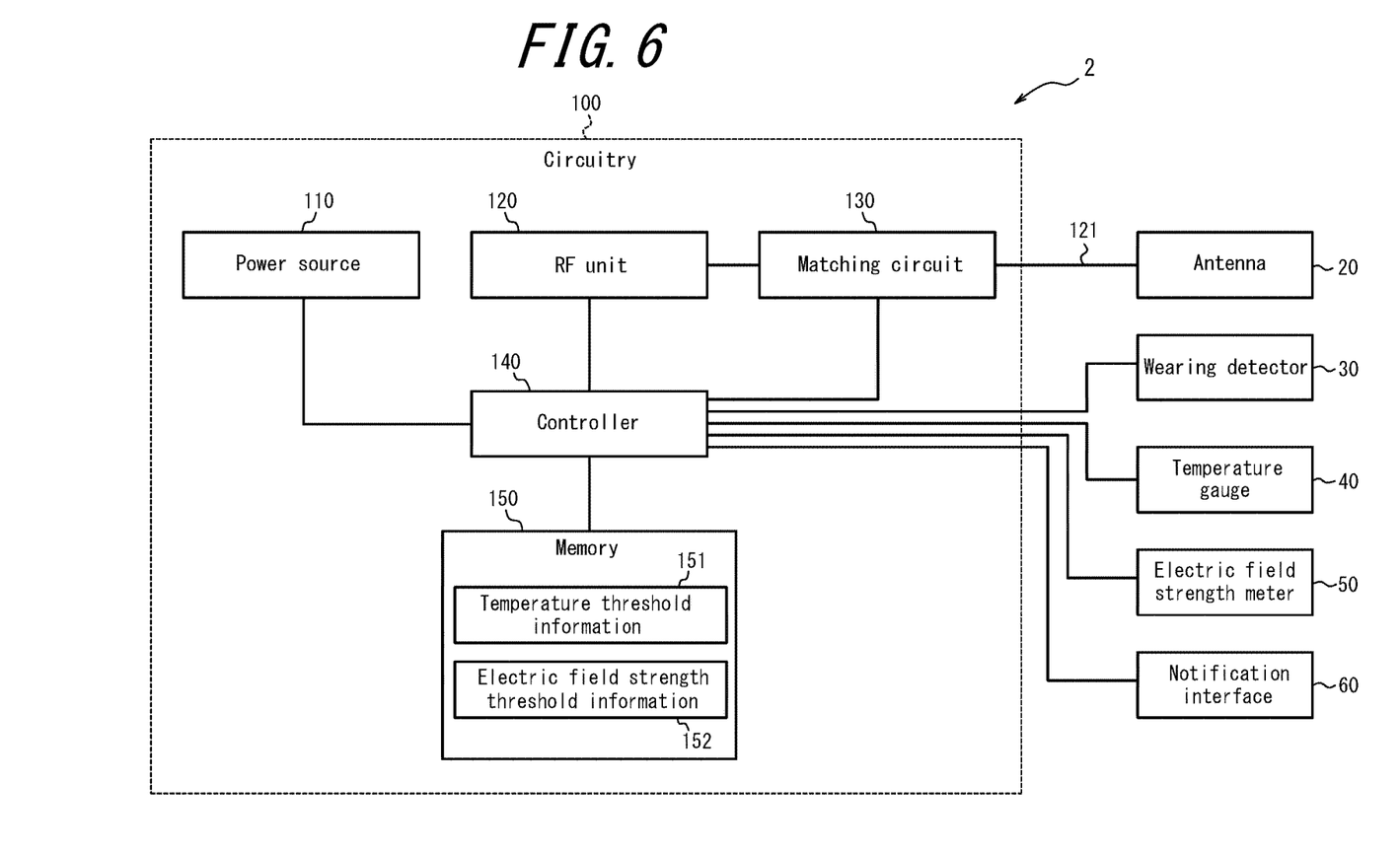
FIG. 6 is a block diagram schematically illustrating the configuration of an electronic device according to Embodiment 2.

FIG. 6 is a block diagram schematically illustrating the configuration of an electronic device 2 according to Embodiment 2. The schematic configuration of the electronic device 2 in terms of appearance is similar to that of the electronic device 1 illustrated in FIG. 1. Therefore, a description is omitted.

As illustrated in FIG. 6, the electronic device 2 is further provided with a temperature gauge 40, an electric field strength meter 50, and a notification interface 60. The circuitry 100 provided in the electronic device 2 includes a power source 110, an RF unit 120, a matching circuit 130, a controller 140, and a memory 150. The memory 150 stores temperature threshold information 151 and electric field strength threshold information 152. Other than the temperature threshold information 151 and the electric field strength threshold information 152, the configuration of the circuitry 100 is similar to each corresponding component of the electronic device 1. Therefore, a description is omitted.

The temperature gauge 40 is a device that measures temperature and is configured by a temperature measurement circuit or the like. The temperature gauge 40 may, for example, be provided inside the electronic device 1 and measure the temperature inside the electronic device 1.

The electric field strength meter 50 is a device that, for example, measures the strength of the electric field received from a base station. The electric field strength meter 50 may, for example, be configured integrally with the controller 140.

The notification interface 60 is a device that notifies the user of information. In this embodiment, the notification interface 60 is configured by a liquid crystal display apparatus that is incorporated in the lenses 12 and 13 and displays images. A projector that generates an image visible to the user through the lenses 12 and 13, a speaker that outputs audio, a vibration apparatus that vibrates the electronic device 2, or the like may be appropriately combined as the notification interface 60 along with or instead of a display apparatus such as a liquid crystal display apparatus.

The temperature threshold information 151 includes a first temperature and a second temperature used as temperature thresholds during the below-described second suspension processing. The first temperature is a temperature threshold used in the state in which the electronic device 2 is worn on the body. The first temperature is a temperature at which the body preferably does not continuously contact the electronic device 2. Although the first temperature changes in accordance with contact time and material, the first temperature may, for example, be 43° C.

The second temperature is a higher temperature than the first temperature. The second temperature is a temperature threshold used in the state in which the electronic device 2 is not worn on the body. The second temperature is a temperature at which the time of continuous contact between the body and the electronic device 2 should be kept shorter than for the first temperature. Although the second temperature changes in accordance with contact time and material, the second temperature may, for example, be 60° C. The first temperature and the second temperature are not limited to the aforementioned values, and other temperatures may be used as appropriate. For example, the first temperature may be 48° C. The second temperature may, for example, be 48° C., 51° C., 56° C., 60° C., or the like.

The electric field strength threshold information 152 includes information on a predetermined electric field strength used as an electric field strength threshold during the below-described second suspension processing. For example, during wireless communication such as Long Term Evolution (LTE), in general radio waves can be transmitted at a lower strength as the electric field strength is stronger, whereas radio waves need to be transmitted at a higher strength as the electric field strength is weaker. Transmitting radio waves at high strength leads to an increase in the SAR and a rise in temperature. Therefore, a predetermined electric field strength is used as a threshold for the electric field strength to determine whether to transmit radio waves.

Figure 7:
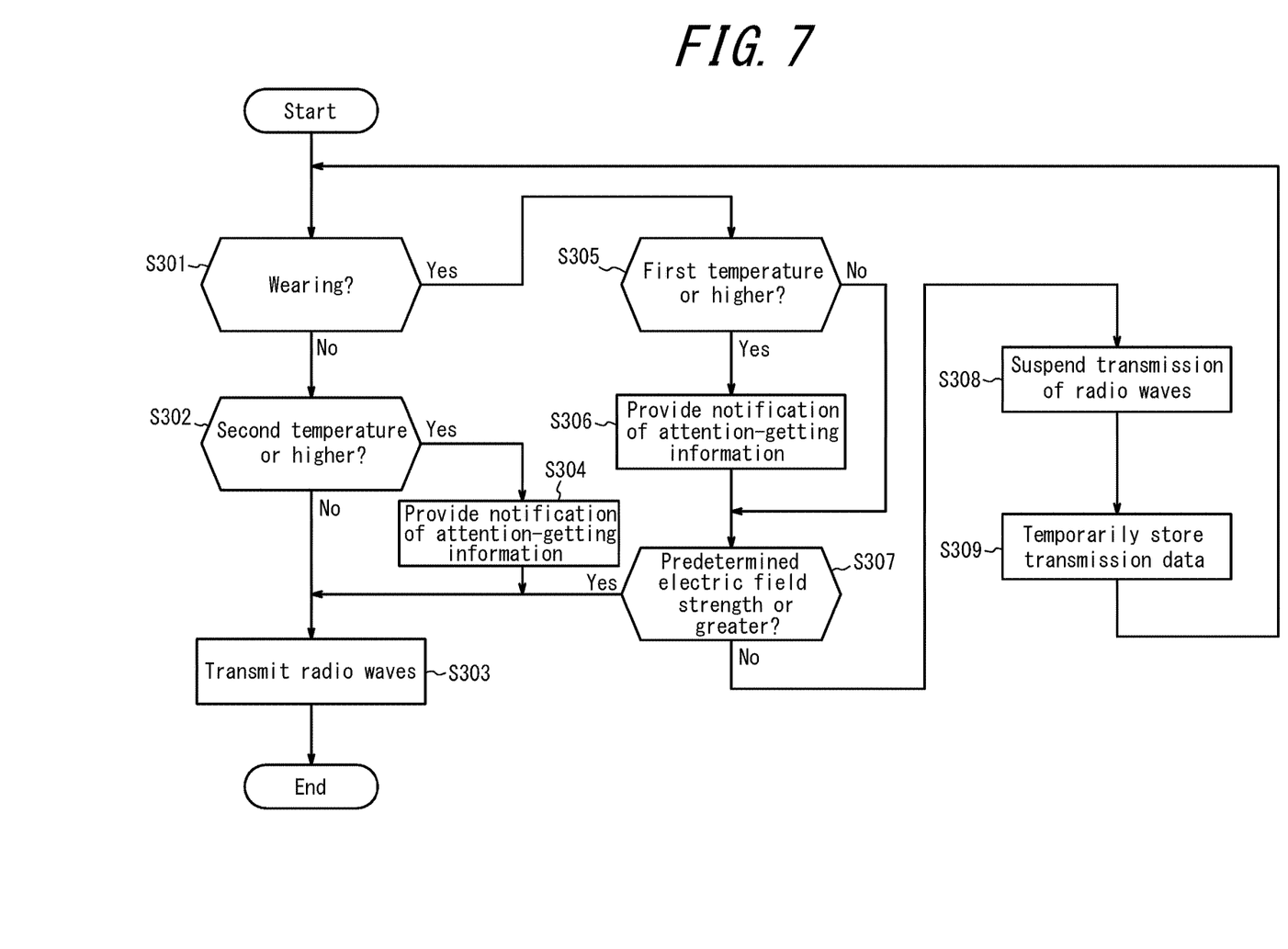
FIG. 7 is a flowchart illustrating second suspension processing by the electronic device in FIG. 6.

Next, with reference to the flowchart in FIG. 7, the processing to suspend radio wave transmission executed by the controller 140 of the electronic device 2 ("second suspension processing") is described.

In step S301, the controller 140 detects whether the electronic device 2 is being worn on the body based on the result of detection by the wearing detector 30. The controller 140 proceeds to the processing in step S305 when the electronic device 2 is being worn on the body (step S301: Yes) and proceeds to the processing in step S302 when the electronic device 2 is not being worn on the body (step S301: No).

In the processing in step S302, the controller 140 acquires the temperature measured by the temperature gauge 40 and determines whether the acquired temperature is equal to or greater than the second temperature. The second temperature is, for example, 48° C. as described above. When determining that the acquired temperature is less than the second temperature (step S302: No), the controller 140 proceeds to the processing in step S303. Conversely, when determining that the acquired temperature is equal to or greater than the second temperature (step S302: Yes), the controller 140 proceeds to the processing in step S304. When determining that the acquired temperature is equal to or greater than the second temperature (step S302: Yes), the controller 140 may terminate processing without proceeding to the processing in step S304. Some electronic devices are designed so as not to become the second temperature or higher, for example by restricting functions. Upon becoming the second temperature or higher, some devices suspend functions. If the electronic device 2 is such an electronic device, then upon determining that the acquired temperature is the second temperature or higher (step S302: Yes), the controller 140 terminates processing without proceeding to the processing in step S304.

In step S303, the controller 140 transmits radio waves via the RF unit 120 in accordance with normal processing and then terminates the processing. In the processing in step S303, if there is transmission data stored in the memory 150, the controller 140 may execute processing to transmit the stored transmission data.

In the processing in step S304, the controller 140 notifies the user of attention-getting information via the notification interface 60 and proceeds to the processing in step S303. As used here, attention-getting information for example is information encouraging the user to suspend use of the electronic device 2. The notification interface 60 may instead provide notification of other information as the attention-getting information. As an example of such other information, the controller 140 may provide notification that continuing to wear and use the electronic device 2 would be dangerous.

When the notification interface 60 is a display apparatus embedded in the lenses 12 and 13, these notifications may for example be provided as attention-getting character data shown on the screen by a pop-up display. Notification may be provided in any or a combination of the following ways as well: by image projection in the case of the notification interface 60 being a projector that projects an image, by audio in the case of the speaker, and by vibration in the case of a vibrating component. The controller 140 may cause attention-getting character data to be shown on the screen by a pop-up display on the display side of the lenses 12, 13 opposing the user's eyes. In this case, by displaying attention-getting character data on the display side of the lenses 12, 13 opposing the user's eyes, the character data are more visible to the user when the user puts on the electronic device 2. Hence, the user can be notified of a warning more appropriately.

In the processing in step S305, the controller 140 acquires the temperature measured by the temperature gauge 40 and determines whether the acquired temperature is equal to or greater than the first temperature. The first temperature is, for example, 43° C. as described above. When determining that the acquired temperature is less than the first temperature (step S305: No), the controller 140 proceeds to the processing in step S307. Conversely, when determining that the acquired temperature is equal to or greater than the first temperature (step S305: Yes), the controller 140 proceeds to the processing in step S306.

In the processing in step S306, the controller 140 notifies the user of attention-getting information via the notification interface 60 and proceeds to the processing in step S307. As used here, attention-getting information for example is information encouraging the user to suspend use of the electronic device 2. The notification interface 60 may instead provide notification of other information as the attention-getting information. As an example of such other information, a notification may indicate that continuing to wear and use the electronic device 2 would be dangerous.

When the notification interface 60 is a display apparatus embedded in the lenses 12 and 13, these notifications may for example be provided as attention-getting character data shown on the screen by a pop-up display. Notification may be provided in any or a combination of the following ways as well: by image projection in the case of the notification interface 60 being a projector that projects an image, by audio in the case of the speaker, and by vibration in the case of a vibrating component. The controller 140 may cause attention-getting character data to be shown on the screen by a pop-up display on the display side of the lenses 12, 13 opposing the user's eyes. In this case, by displaying attention-getting character data on the display side of the lenses 12, 13 opposing the user's eyes, the character data are more visible to the user. Hence, the user can be notified of a warning more appropriately.

In step S307, the controller 140 acquires the electric field strength measured by the electric field strength meter 50 and determines whether the acquired electric field strength is equal to or greater than the predetermined electric field strength included in the electric field strength threshold information 152. When determining that the acquired electric field strength is equal to or greater than the predetermined electric field strength (step S307: Yes), the controller 140 proceeds to the processing in step S303. Conversely, when determining that the acquired electric field strength is less than the predetermined electric field strength (step S307: No), the controller 140 proceeds to the processing in step S308.

In the processing in step S308, the controller 140 suspends transmission of radio waves via the RF unit 120 and then proceeds to the processing in step S309. In the processing in step S309, the controller 140 stores transmission data to be transmitted in the memory 150 and then proceeds to the processing in step S301.

In this way, the electronic device 2 of this embodiment provides the user with an attention-getting notification when, during the state of wearing by the user, the temperature is equal to or greater than the first temperature that is undesirable for the user. Accordingly, the user can use the electronic device 2 safely, which increases the user-friendliness of the electronic device 2.

Also, when in the state of wearing by the user, the electronic device 2 according to this embodiment suspends transmission of radio waves if the strength of the electric field received from the base station is less than a predetermined value. The electronic device 2 then transmits radio waves upon release from the state of wearing by the user, or upon measuring an electric field strength equal to or greater than a predetermined electric field strength. Therefore, the electronic device 2 can control transmission of radio waves in accordance with the electric field strength. Measures can thus be taken against the SAR.

The electronic device 2 according to this embodiment also provides the user with an attention-getting notification when, during the state of non-wearing by the user, the temperature is equal to or greater than the second temperature, at which contact should be kept to a short time. Accordingly, the user can use the electronic device 2 safely, which increases user-friendliness.

Embodiment 3

Figure 8:
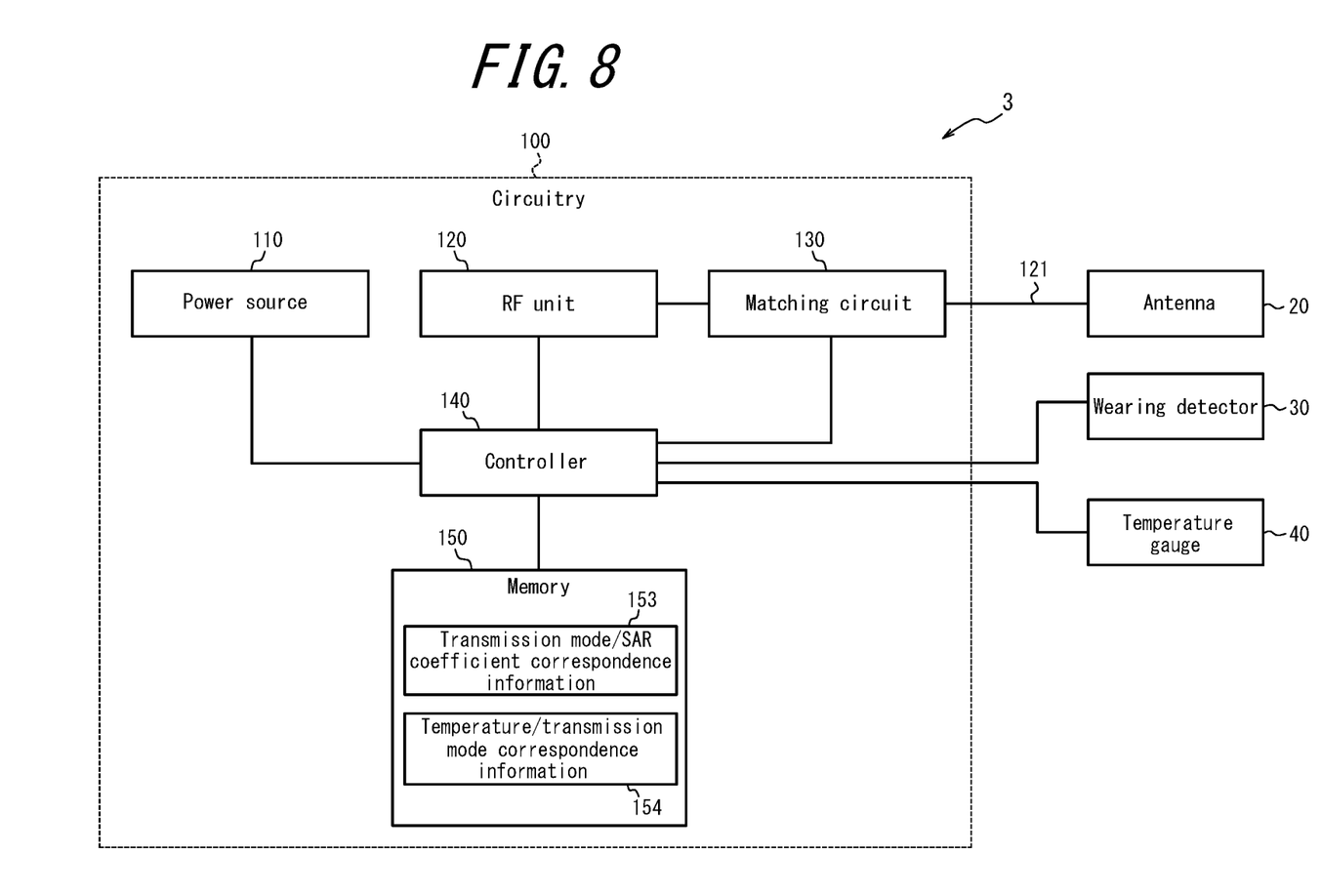
FIG. 8 is a block diagram schematically illustrating the configuration of an electronic device according to Embodiment 3.

FIG. 8 is a block diagram schematically illustrating the configuration of an electronic device 3 according to Embodiment 3. The schematic configuration of the electronic device 3 in terms of appearance is similar to that of the electronic device 1 illustrated in FIG. 1. Therefore, a description is omitted.

As illustrated in FIG. 8, the electronic device 3 is further provided with a temperature gauge 40. The circuitry 100 provided in the electronic device 3 includes a power source 110, an RF unit 120, a matching circuit 130, a controller 140, and a memory 150. The memory 150 stores transmission mode/SAR coefficient correspondence information 153 and temperature/transmission mode correspondence information 154. Other than the transmission mode/SAR coefficient correspondence information 153 and the temperature/transmission mode correspondence information 154, the configuration of the circuitry 100 is similar to each corresponding component of the electronic device 1. Therefore, a description is omitted.

Figure 9:
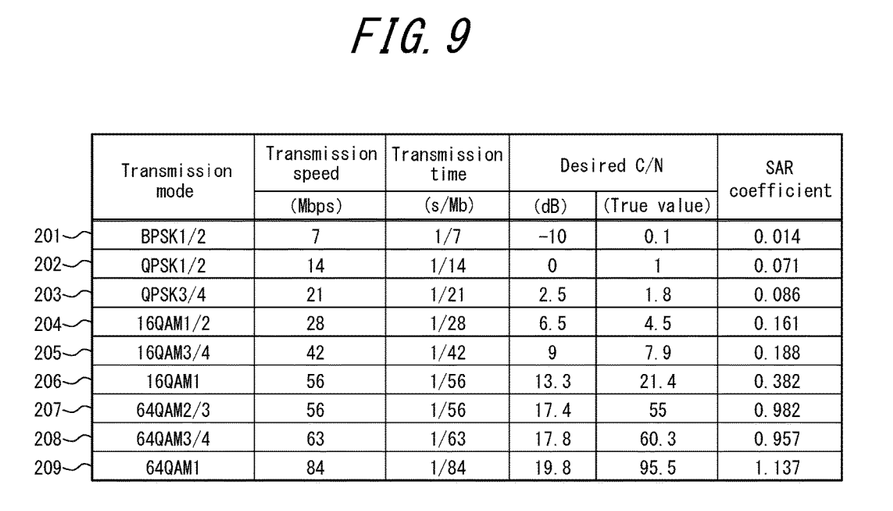
FIG. 9 illustrates an example of transmission mode/SAR coefficient correspondence information.

The transmission mode/SAR coefficient correspondence information 153 is information associating the transmission mode that the electronic device 3 uses for transmission of radio waves with the below-described SAR coefficient. FIG. 9 illustrates an example of the transmission mode/SAR coefficient correspondence information 153.

The transmission mode refers to a combination of the modulation scheme and the code rate. FIG. 9 illustrates an example using LTE as the communication standard for the transmission mode.

Figure 10:
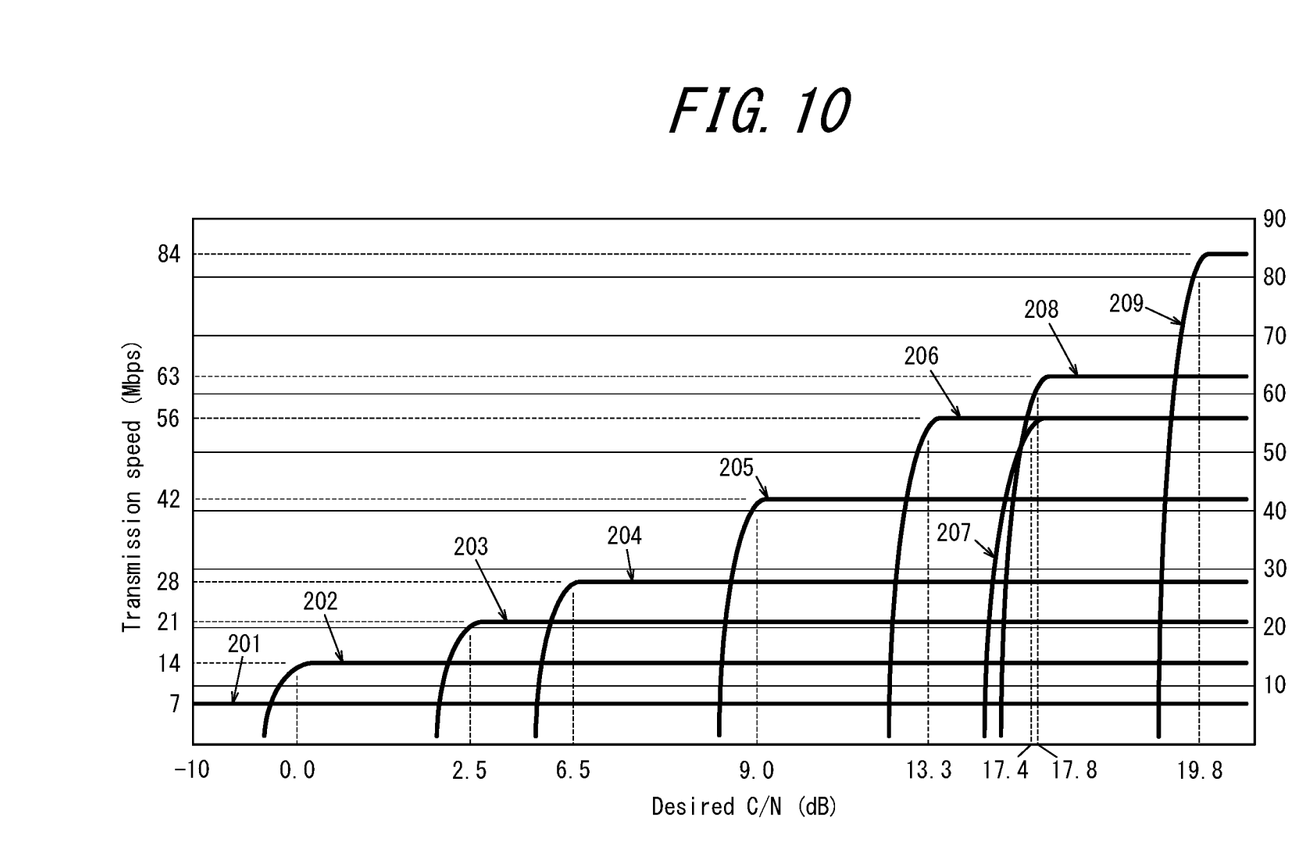
FIG. 10 illustrates an example of the correspondence relationship between a desired C/N and transmission speed for each transmission mode.

The SAR coefficient refers to the coefficient indicating the magnitude of the SAR. The SAR coefficient is obtained by, for example, multiplying the transmission time, which is the inverse of the transmission speed, by the true value of the desired carrier-to-noise ratio (C/N). Here, the transmission speed and the desired C/N used to calculate the SAR coefficient can be determined based on the correspondence relationship between the desired C/N and the transmission speed for each transmission mode. FIG. 10 illustrates the correspondence relationship between the desired C/N and the transmission speed for each transmission mode when using LTE as the communication standard.

For reference, FIG. 10 shows the transmission speed [Mbps] and the desired C/N [dB] for each transmission mode based on the correspondence relationships indicated in FIG. 9. The SAR coefficients calculated based on these values are associated with the transmission modes and stored as the transmission mode/SAR coefficient correspondence information 153. The desired C/N can be treated as the minimum transmission power in the case of LTE.

Figure 11:
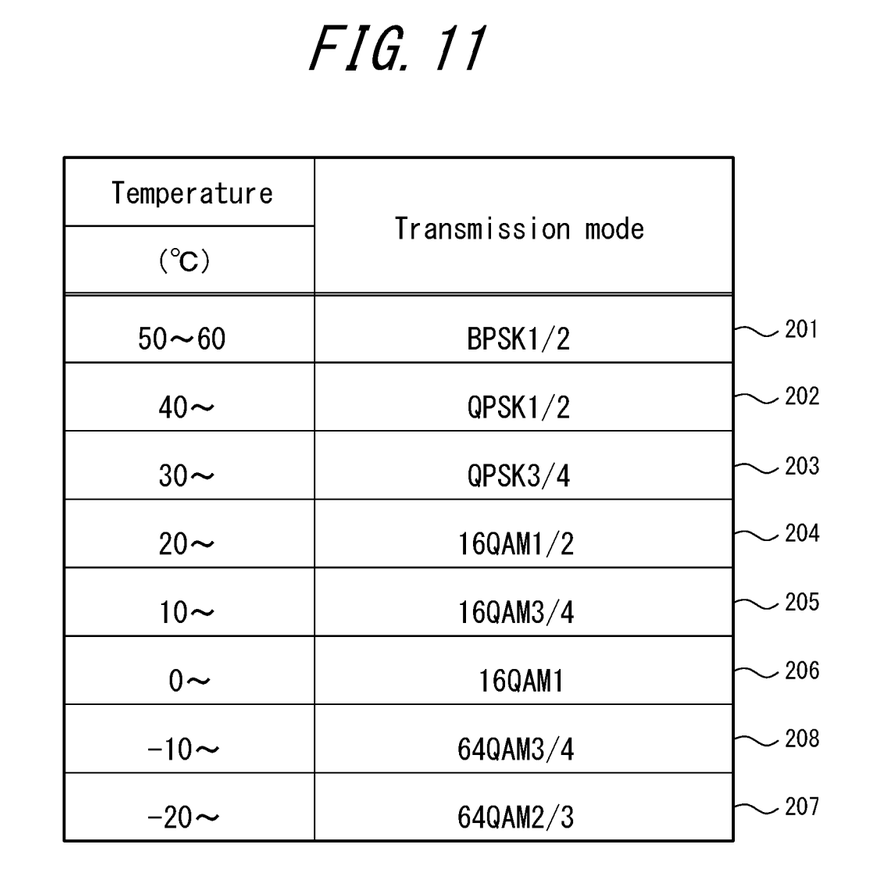
FIG. 11 illustrates an example of temperature/transmission mode correspondence information.

For example as illustrated in FIG. 11, the temperature/transmission mode correspondence information 154 is information associating temperature ranges with transmission modes. In the temperature/transmission mode correspondence information 154, as the temperature range is higher, the associated transmission mode corresponds to a lower SAR coefficient. Here, the temperature range included in the temperature/transmission mode correspondence information 154 may for example use the minimum temperature at which the electronic device 3 is guaranteed to operate as the lower limit and a temperature undesirable for the body when the electronic device 3 is worn as the upper limit.

Figure 12:
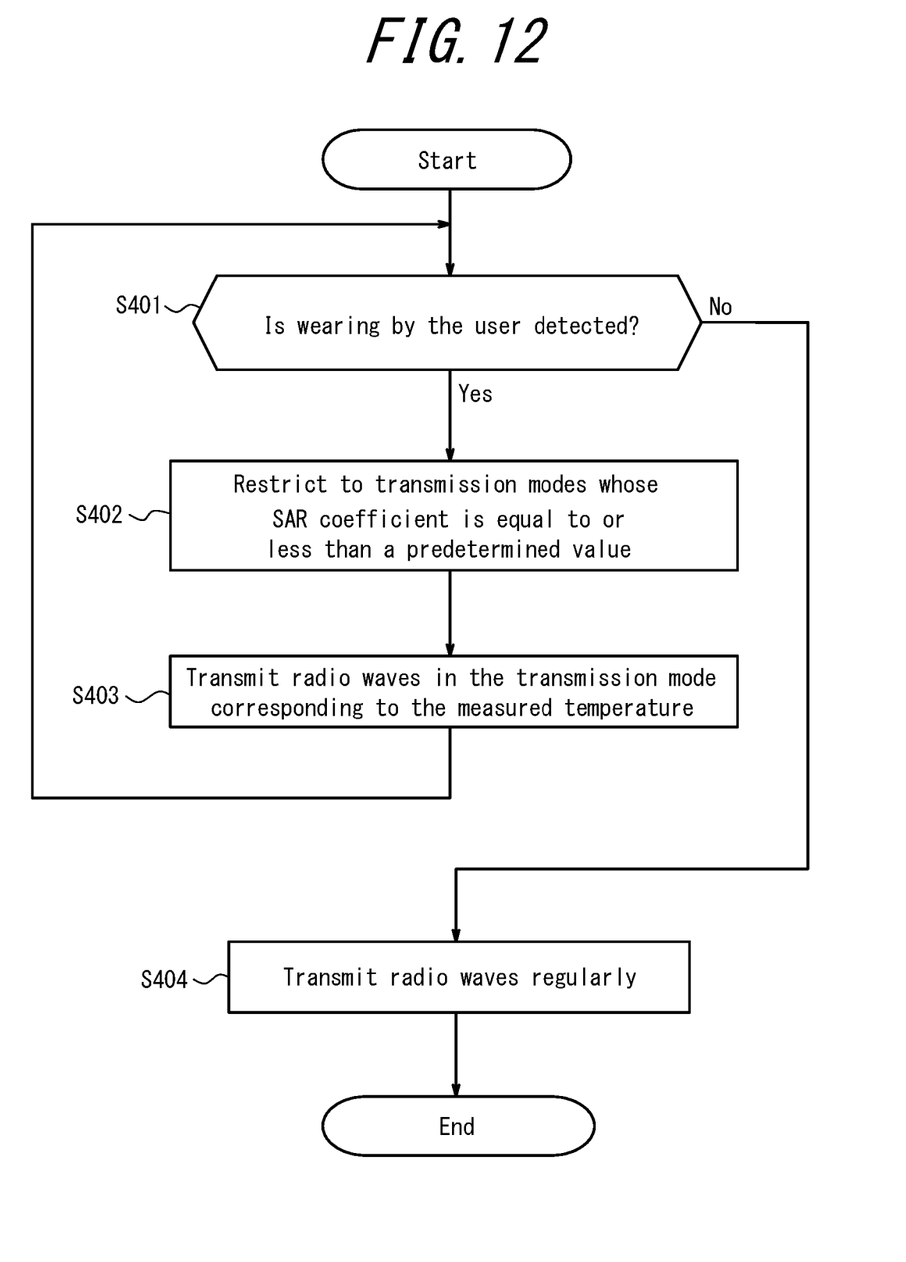
FIG. 12 is a flowchart illustrating transmission restriction processing by the electronic device in FIG. 8.

Next, with reference to the flowchart in FIG. 12, the processing executed by the controller 140 of the electronic device 3 is described.

The controller 140 determines whether wearing by the user is detected by the wearing detector 30 (step S401). When wearing by the user is detected (step S401: Yes), the controller 140 proceeds to the processing in step S402. On the other hand, when wearing by the user is not detected (step S401: No), the controller 140 transmits radio waves via the RF unit 120 in accordance with regular processing (step S404) and terminates this processing. As used herein, transmission of radio waves in accordance with regular processing refers to transmission performed without restricting the transmission modes used for transmission, but rather by increasingly prioritizing use as the SAR coefficient of the transmission mode is higher. The transmission mode that is used may be changed, however, in accordance with the electric field strength and the temperature measured by the temperature gauge 40.

In the processing in step S402, the controller 140 uses the transmission mode/SAR coefficient correspondence information 153 to restrict the transmission modes used to transmit radio waves to transmission modes with a SAR coefficient of a predetermined value or less and proceeds to the processing of step S403. For example, when 0.5 is set as the predetermined value of the SAR coefficient, the transmission modes are restricted to transmission modes with an SAR coefficient of 0.5 or less. When, for example, using LTE as the communication standard, 64 QAM2/3, 64QAM3/4, and 64QAM1, which as illustrated in FIG. 9 are transmission modes whose SAR coefficient exceeds 0.5, are excluded from the transmission modes used to transmit radio waves.

In the processing in step S403, the controller 140 refers to the temperature/transmission mode correspondence information 154 and selects the transmission mode corresponding to the temperature measured by the temperature gauge 40. The controller 140 then transmits radio waves via the RF unit 120 using the selected transmission mode and returns to the processing in step S401. At this time, the transmission mode selected in the processing in step S403 is within the range of transmission modes restricted by the processing in step S402. Here, when the measured temperature exceeds the upper limit of the temperature ranges included in the temperature/transmission mode correspondence information 154, then in the processing of step S302 in the above-described second suspension processing, similar processing to the processing when the measured temperature is determined to be equal to or greater than the second temperature may be executed.

In this way, when in the state of wearing by the user, the electronic device 3 transmits radio waves by restricting the transmission modes to transmission modes whose SAR coefficient is equal to or less than a predetermined value. Accordingly, the electronic device 3 can reduce the SAR while continuing to transmit radio waves.

Furthermore, when in the state of wearing by the user, the electronic device 3 transmits radio waves by selecting a transmission mode, from within a range of transmission modes whose SAR coefficient is a predetermined value or less, with a lower SAR coefficient as the temperature is higher. Accordingly, in addition to the above-described effects, the electronic device 3 can prevent the temperature from becoming too high.

The present disclosure is based on the drawings and on embodiments, yet it should be noted that a person of ordinary skill in the art could easily make a variety of modifications and adjustments based on the present disclosure. Therefore, such changes and modifications are to be understood as included within the scope of the present disclosure. For example, the functions and the like included in the various components and steps may be reordered in any logically consistent way. Furthermore, components or steps may be combined into one or divided.

The circuitry 100 provided in the electronic devices 1, 2, and 3 has been described as being provided at any position in the electronic devices 1, 2, and 3, but the circuitry 100 may be provided in a separate housing that can communicate with the electronic devices 1, 2, and 3 by a wired or wireless connection.

The electronic devices 1 and 3 may each further be provided with the notification interface 60 and may be configured to provide notification of the attention-getting information via the notification interface 60 when restricting the transmitted radio waves.

The electronic device 3 may be configured to transmit radio waves within the range of transmission modes restricted by the processing in step S402 without executing the processing in step S403. In this case, the electronic device 3 need not store the temperature/transmission mode correspondence information 154 in the memory 150.

The electronic device 1 has been described as being an eyeglasses-type electronic device but is not restricted to this configuration. It suffices for the electronic device 1 to be wearable on the body, such as a wristband-type, clothing-type, or other type of electronic device.

The controller 140 provided in each of the electronic devices 1 and 2 may restrict transmission of radio waves by restricting the transmission mode used for transmission of radio waves instead of suspending transmission of radio waves. Furthermore, the controller 140 provided in each of the electronic devices 1 and 2 may restrict any processing executed by the electronic devices 1 and 2 instead of restricting transmission of radio waves.

The invention claimed is:

1. An electronic device comprising:
 a wearing detector provided at a position that comes close to or in contact with a human body when the electronic device is worn by a user, the wearing detector being configured to detect wearing of the electronic device by the user;
 an antenna configured to transmit radio waves;
 a controller configured to restrict transmission of radio waves from the antenna when wearing is detected by the wearing detector; and
 a memory configured to store transmission data;
 wherein the controller stores transmission data in the memory while restricting transmission of radio waves and transmits the transmission data stored in the memory upon restarting transmission of radio waves.

2. The electronic device of claim 1, wherein the controller restricts transmission of radio waves by suspending transmission of radio waves.

3. The electronic device of claim 1, wherein the controller restricts transmission of radio waves by restricting a transmission mode used for transmission of radio waves.

4. An electronic device comprising:
 a wearing detector provided at a position that comes close to or in contact with a human body when the electronic device is worn by a user, the wearing detector being configured to detect wearing of the electronic device by the user;
 an antenna configured to transmit radio waves;
 a controller configured to restrict transmission of radio waves from the antenna when wearing is detected by the wearing detector; and
 a memory configured to store transmission mode/SAR coefficient correspondence information associating the transmission mode with a SAR coefficient indicating a magnitude of a specific absorption rate;
 wherein the controller restricts transmission of radio waves by restricting a transmission mode used for transmission of radio waves and the controller uses the transmission mode/SAR coefficient correspondence information to restrict the transmission mode used for transmission of radio waves to a transmission mode corresponding to a SAR coefficient of a predetermined value or less.

5. The electronic device of claim 4, further comprising:
 a temperature gauge configured to measure temperature;
 wherein the memory is further configured to store temperature/transmission mode correspondence information associating a temperature range with the transmission mode; and
 the controller uses the temperature/transmission mode correspondence information to transmit radio waves in a transmission mode corresponding to the temperature measured by the temperature gauge.

6. The electronic device of claim 4, wherein the SAR coefficient is a coefficient obtained by multiplying an inverse of the transmission speed by a desired carrier-to-noise ratio.

7. The electronic device of claim 1, wherein the controller suspends restriction of transmission of radio waves when non-detection of wearing is continuous for a predetermined time after wearing is detected by the wearing detector.

8. The electronic device of claim 1, wherein the wearing detector is configured integrally with the antenna.

9. An electronic device comprising:
 a wearing detector provided at a position that comes close to or in contact with a human body when the electronic device is worn by a user, the wearing detector being configured to detect wearing of the electronic device by the user;
 an antenna configured to transmit radio waves;
 a controller configured to restrict transmission of radio waves from the antenna when wearing is detected by the wearing detector;
 an electric field strength meter configured to measure electric field strength; and
 a memory configured to store a predetermined electric field strength as threshold information on electric field strength;
 wherein the controller restricts transmission of radio waves when the electric field strength measured by the electric field strength meter is less than the predetermined electric field strength.

10. The electronic device of claim 1, further comprising:
 a temperature gauge configured to measure temperature;
 a memory configured to store a predetermined temperature as a temperature threshold; and
 a notification interface;
 wherein the controller causes the notification interface to provide notification when the temperature measured by the temperature gauge is equal to or greater than the predetermined temperature.

11. The electronic device of claim 1, further comprising:
a matching circuit configured to adjust impedance;
wherein the controller controls the matching circuit in accordance with a result of detection by the wearing detector.

12. The electronic device of claim 1,
wherein the controller determines that the electronic device is in a state of wearing by the user when detection of wearing by the wearing detector is continuous for a predetermined time or longer; and
wherein the controller determines that the electronic device is in a state of non-wearing by the user when non-detection of wearing by the wearing detector is continuous for a predetermined time or longer.

13. The electronic device of claim 1, further comprising:
a temple to be positioned on a side of a head of the human body; and
a nose pad to be positioned on a nose of the human body;
wherein the wearing detector is disposed in at least one of the temple and the nose pad.

14. The electronic device of claim 13, wherein the antenna is formed in the temple.

* * * * *